(12) United States Patent
Thomas

(10) Patent No.: US 7,809,538 B2
(45) Date of Patent: Oct. 5, 2010

(54) REAL TIME MONITORING AND CONTROL OF THERMAL RECOVERY OPERATIONS FOR HEAVY OIL RESERVOIRS

(75) Inventor: Jacob Thomas, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1245 days.

(21) Appl. No.: 11/332,576

(22) Filed: Jan. 13, 2006

(65) Prior Publication Data
US 2007/0168170 A1    Jul. 19, 2007

(51) Int. Cl.
G06G 7/48    (2006.01)
(52) U.S. Cl. ........................................... 703/10; 702/13
(58) Field of Classification Search ...................... 703/2, 703/6, 9, 10; 702/6–13
See application file for complete search history.

(56) References Cited

U.S. PATENT DOCUMENTS

| | | |
|---|---|---|
| 1,263,618 A | 4/1918 | Squires |
| 1,342,741 A | 6/1920 | Day |
| 1,457,479 A | 6/1923 | Wolcott |
| 1,726,041 A | 8/1929 | Powell |
| 1,918,076 A | 7/1933 | Woolson |
| 2,173,556 A | 9/1939 | Hixon |
| 2,584,606 A | 2/1952 | Merriam et al. |
| 2,670,802 A | 3/1954 | Ackley |
| 2,734,578 A | 2/1956 | Walter |
| 2,767,791 A | 10/1956 | van Dijck |
| 2,825,408 A | 3/1958 | Watson |
| 2,862,557 A | 12/1958 | van Utenhove et al. |
| 2,880,802 A | 4/1959 | Carpenter |
| 2,889,881 A | 6/1959 | Trantham et al. |
| 2,901,043 A | 8/1959 | Campion et al. |
| 2,914,309 A | 11/1959 | Salomonsson |
| 3,040,809 A | 6/1962 | Pelzer |
| 3,055,427 A | 9/1962 | Pryor et al. |

(Continued)

FOREIGN PATENT DOCUMENTS

EP    0 088 376 A2    9/1983

(Continued)

OTHER PUBLICATIONS

Notification of Transmittal of the International Search Report and the Written Opinion of the International Searching Authority, or the Declaration, Form PCT/ISA/220; International Search Report, Form PCT/ISA/210; and Written Opinion for PCT/US2007/000782, Form PCT/ISA/237, mailed Jun. 4, 2007, 11 pages.

(Continued)

Primary Examiner—Russell Frejd
(74) Attorney, Agent, or Firm—Joshua A. Griswold

(57) ABSTRACT

Systems and techniques, including computer programs, for monitoring and controlling thermal recovery involve generating input parameters for use in real time monitoring and controlling of a thermal recovery operation for a reservoir. The input parameters to a thermal generator are generated using a reservoir simulator and an economic model, and the input parameters have a corresponding predicted output of the thermal recovery operation. Data indicative of actual output from the reservoir is received, and the reservoir simulator is automatically updated based on a comparison of the data indicative of the actual output with the predicted output.

32 Claims, 4 Drawing Sheets

U.S. PATENT DOCUMENTS

| | | |
|---|---|---|
| 3,113,619 A | 12/1963 | Reichle |
| 3,127,935 A | 4/1964 | Poettmann et al. |
| 3,129,757 A | 4/1964 | Sharp |
| 3,135,326 A | 6/1964 | Santee |
| 3,141,502 A | 7/1964 | Dew et al. |
| 3,154,142 A | 10/1964 | Latta |
| 3,156,299 A | 11/1964 | Trantham |
| 3,163,215 A | 12/1964 | Stratton |
| 3,174,544 A | 3/1965 | Campion et al. |
| 3,182,722 A | 5/1965 | Reed |
| 3,205,944 A | 9/1965 | Walton |
| 3,221,809 A | 12/1965 | Walton |
| 3,232,345 A | 2/1966 | Trantham et al. |
| 3,237,689 A | 3/1966 | Justheim |
| 3,246,693 A | 4/1966 | Crider |
| 3,294,167 A | 12/1966 | Vogel |
| 3,310,109 A | 3/1967 | Marx et al. |
| 3,314,476 A | 4/1967 | Staples et al. |
| 3,315,745 A | 4/1967 | Rees, Jr. |
| 3,322,194 A | 5/1967 | Strubbar |
| 3,332,482 A | 7/1967 | Trantham |
| 3,334,687 A | 8/1967 | Parker |
| 3,342,257 A | 9/1967 | Jacobs et al. |
| 3,342,259 A | 9/1967 | Powell |
| 3,351,132 A | 11/1967 | Dougan et al. |
| 3,361,201 A | 1/1968 | Howard |
| 3,363,686 A | 1/1968 | Gilchrist |
| 3,363,687 A | 1/1968 | Dean |
| 3,379,246 A | 4/1968 | Sklar et al. |
| 3,379,248 A | 4/1968 | Strange |
| 3,406,755 A | 10/1968 | Sharp |
| 3,411,578 A | 11/1968 | Holmes |
| 3,412,793 A | 11/1968 | Needham |
| 3,412,794 A | 11/1968 | Craighead |
| 3,422,891 A | 1/1969 | Alexander et al. |
| 3,430,700 A | 3/1969 | Satter et al. |
| 3,441,083 A | 4/1969 | Fitzgerald |
| 3,454,958 A | 7/1969 | Parker |
| 3,456,721 A | 7/1969 | Smith |
| 3,490,529 A | 1/1970 | Parker |
| 3,490,531 A | 1/1970 | Dixon |
| 3,507,330 A | 4/1970 | Gill |
| 3,547,192 A | 12/1970 | Claridge et al. |
| 3,554,285 A | 1/1971 | Meldau |
| 3,605,888 A | 9/1971 | Crowson et al. |
| 3,608,638 A | 9/1971 | Terwilliger |
| 3,653,438 A | 4/1972 | Wagner |
| 3,685,581 A | 8/1972 | Hess et al. |
| 3,690,376 A | 9/1972 | Zwicky et al. |
| 3,703,927 A | 11/1972 | Harry |
| 3,724,043 A | 4/1973 | Eustance |
| 3,727,686 A | 4/1973 | Prates et al. |
| 3,759,328 A | 9/1973 | Ueber et al. |
| 3,771,598 A | 11/1973 | McBean |
| 3,782,465 A | 1/1974 | Bell et al. |
| 3,796,262 A | 3/1974 | Allen et al. |
| 3,804,169 A | 4/1974 | Closmann |
| 3,805,885 A | 4/1974 | Van Huisen |
| 3,822,747 A | 7/1974 | Maguire, Jr. |
| 3,827,495 A | 8/1974 | Reed |
| 3,837,402 A | 9/1974 | Stringer |
| 3,838,738 A | 10/1974 | Redford et al. |
| 3,847,224 A | 11/1974 | Allen et al. |
| 3,872,924 A | 3/1975 | Clampitt |
| 3,892,270 A | 7/1975 | Lindquist |
| 3,905,422 A | 9/1975 | Woodward |
| 3,929,190 A | 12/1975 | Chang et al. |
| 3,931,856 A | 1/1976 | Barnes |
| 3,945,679 A | 3/1976 | Closmann et al. |
| 3,946,809 A | 3/1976 | Hagedorn |
| 3,954,139 A | 5/1976 | Allen |
| 3,958,636 A | 5/1976 | Perkins |
| 3,964,546 A | 6/1976 | Allen |
| 3,967,853 A | 7/1976 | Closmann et al. |
| 3,978,920 A | 9/1976 | Bandyopadhyay et al. |
| 3,993,133 A | 11/1976 | Clampitt |
| 3,994,340 A | 11/1976 | Anderson et al. |
| 3,994,341 A | 11/1976 | Anderson et al. |
| 3,997,004 A | 12/1976 | Wu |
| 3,999,606 A | 12/1976 | Bandyopadhyay et al. |
| 4,004,636 A | 1/1977 | Brown et al. |
| 4,007,785 A | 2/1977 | Allen et al. |
| 4,007,791 A | 2/1977 | Johnson |
| 4,008,765 A | 2/1977 | Anderson et al. |
| 4,019,575 A | 4/1977 | Pisio et al. |
| 4,019,578 A | 4/1977 | Terry et al. |
| 4,020,901 A | 5/1977 | Pisio et al. |
| 4,022,275 A | 5/1977 | Brandon |
| 4,022,280 A | 5/1977 | Stoddard et al. |
| 4,026,358 A | 5/1977 | Allen |
| 4,033,411 A | 7/1977 | Goins |
| 4,037,655 A | 7/1977 | Carpenter |
| 4,037,658 A | 7/1977 | Anderson |
| 4,049,053 A | 9/1977 | Fisher et al. |
| 4,066,127 A | 1/1978 | Harnsberger |
| 4,067,391 A | 1/1978 | Dewell |
| 4,068,715 A | 1/1978 | Wu |
| 4,068,717 A | 1/1978 | Needham |
| 4,078,608 A | 3/1978 | Allen et al. |
| 4,084,637 A | 4/1978 | Todd |
| 4,085,799 A | 4/1978 | Bousaid et al. |
| 4,085,800 A | 4/1978 | Engle et al. |
| 4,088,188 A | 5/1978 | Widmyer |
| 4,099,564 A | 7/1978 | Hutchison |
| 4,114,687 A | 9/1978 | Payton |
| 4,114,691 A | 9/1978 | Payton |
| 4,120,357 A | 10/1978 | Anderson |
| 4,124,071 A | 11/1978 | Allen et al. |
| 4,129,183 A | 12/1978 | Kalfoglou |
| 4,129,308 A | 12/1978 | Hutchison |
| 4,130,163 A | 12/1978 | Bombardieri |
| 4,133,382 A | 1/1979 | Cram et al. |
| 4,133,384 A | 1/1979 | Allen et al. |
| 4,140,180 A | 2/1979 | Bridges et al. |
| 4,140,182 A | 2/1979 | Vriend |
| 4,141,415 A | 2/1979 | Wu et al. |
| 4,144,935 A | 3/1979 | Bridges et al. |
| RE30,019 E | 6/1979 | Lindquist |
| 4,160,479 A | 7/1979 | Richardson et al. |
| 4,160,481 A | 7/1979 | Turk et al. |
| 4,174,752 A | 11/1979 | Slater et al. |
| 4,191,252 A | 3/1980 | Buckley et al. |
| 4,202,168 A | 5/1980 | Acheson et al. |
| 4,202,169 A | 5/1980 | Acheson et al. |
| 4,212,353 A | 7/1980 | Hall |
| 4,217,956 A | 8/1980 | Goss et al. |
| 4,228,853 A | 10/1980 | Harvey et al. |
| 4,228,854 A | 10/1980 | Sacuta |
| 4,228,856 A | 10/1980 | Reale |
| 4,246,966 A | 1/1981 | Stoddard et al. |
| 4,248,302 A | 2/1981 | Churchman |
| 4,249,602 A | 2/1981 | Burton, III et al. |
| 4,250,964 A | 2/1981 | Jewell et al. |
| 4,252,194 A | 2/1981 | Felber et al. |
| 4,257,650 A | 3/1981 | Allen |
| 4,260,018 A | 4/1981 | Shum et al. |
| 4,262,745 A | 4/1981 | Stewart |
| 4,265,310 A | 5/1981 | Britton et al. |
| 4,270,609 A | 6/1981 | Choules |
| 4,271,905 A | 6/1981 | Redford et al. |
| 4,274,487 A | 6/1981 | Hollingsworth et al. |
| 4,280,559 A | 7/1981 | Best |
| 4,282,929 A | 8/1981 | Krajicek |
| 4,284,139 A | 8/1981 | Sweany |

| | | | | | |
|---|---|---|---|---|---|
| RE30,738 E | 9/1981 | Bridges et al. | 4,484,630 A | 11/1984 | Chung |
| 4,289,203 A | 9/1981 | Swanson | 4,485,868 A | 12/1984 | Sresty et al. |
| 4,296,814 A | 10/1981 | Stalder et al. | 4,487,262 A | 12/1984 | Venkatesan et al. |
| 4,300,634 A | 11/1981 | Clampitt | 4,487,264 A | 12/1984 | Hyne et al. |
| 4,303,126 A | 12/1981 | Blevins | 4,488,600 A | 12/1984 | Fan |
| 4,305,463 A | 12/1981 | Zakiewicz | 4,488,976 A | 12/1984 | Dilgren et al. |
| 4,306,981 A | 12/1981 | Blair, Jr. | 4,491,180 A | 1/1985 | Brown et al. |
| 4,319,632 A | 3/1982 | Marr, Jr. | 4,498,537 A | 2/1985 | Cook |
| 4,319,635 A | 3/1982 | Jones | 4,498,542 A | 2/1985 | Eisenhawer et al. |
| 4,325,432 A | 4/1982 | Henry | 4,499,946 A | 2/1985 | Martin et al. |
| 4,326,968 A | 4/1982 | Blair, Jr. | 4,501,325 A | 2/1985 | Frazier et al. |
| 4,327,805 A | 5/1982 | Poston | 4,501,326 A | 2/1985 | Edmunds |
| 4,330,038 A | 5/1982 | Soukup et al. | 4,501,445 A | 2/1985 | Gregoli |
| 4,333,529 A | 6/1982 | McCorquodale | 4,503,910 A | 3/1985 | Shu |
| 4,344,483 A | 8/1982 | Fisher et al. | 4,503,911 A | 3/1985 | Hartman et al. |
| 4,344,485 A | 8/1982 | Butler | 4,508,170 A | 4/1985 | Littmann |
| 4,344,486 A | 8/1982 | Parrish | 4,513,819 A | 4/1985 | Islip et al. |
| 4,345,652 A | 8/1982 | Roque | 4,515,215 A | 5/1985 | Hermes et al. |
| 4,362,213 A | 12/1982 | Tabor | 4,516,636 A | 5/1985 | Doscher |
| 4,372,386 A | 2/1983 | Rhoades et al. | 4,522,260 A | 6/1985 | Wolcott, Jr. |
| 4,379,489 A | 4/1983 | Rollmann | 4,522,263 A | 6/1985 | Hopkins et al. |
| 4,379,592 A | 4/1983 | Vakhnin et al. | 4,524,826 A | 6/1985 | Savage |
| 4,380,265 A | 4/1983 | Mohaupt | 4,528,104 A | 7/1985 | House et al. |
| 4,380,267 A | 4/1983 | Fox | 4,530,401 A | 7/1985 | Hartman et al. |
| 4,381,124 A | 4/1983 | Verty et al. | 4,532,993 A | 8/1985 | Dilgren et al. |
| 4,382,469 A | 5/1983 | Bell et al. | 4,532,994 A | 8/1985 | Toma et al. |
| 4,385,661 A | 5/1983 | Fox | 4,535,845 A | 8/1985 | Brown et al. |
| 4,387,016 A | 6/1983 | Gagon | 4,540,049 A | 9/1985 | Hawkins et al. |
| 4,389,320 A | 6/1983 | Clampitt | 4,540,050 A | 9/1985 | Huang et al. |
| 4,390,062 A | 6/1983 | Fox | 4,545,435 A | 10/1985 | Bridges et al. |
| 4,390,067 A | 6/1983 | Willman | 4,546,829 A | 10/1985 | Martin et al. |
| 4,392,530 A | 7/1983 | Odeh et al. | 4,550,779 A | 11/1985 | Zakiewicz |
| 4,393,937 A | 7/1983 | Dilgren et al. | 4,556,107 A | 12/1985 | Duerksen et al. |
| 4,396,063 A | 8/1983 | Godbey | 4,558,740 A | 12/1985 | Yellig, Jr. |
| 4,398,602 A | 8/1983 | Anderson | 4,565,245 A | 1/1986 | Mims et al. |
| 4,406,499 A | 9/1983 | Yildirim | 4,565,249 A | 1/1986 | Pebdani et al. |
| 4,407,367 A | 10/1983 | Kydd | 4,572,296 A | 2/1986 | Watkins |
| 4,410,216 A | 10/1983 | Allen | 4,574,884 A | 3/1986 | Schmidt |
| 4,411,618 A | 10/1983 | Donaldson et al. | 4,574,886 A | 3/1986 | Hopkins et al. |
| 4,412,585 A | 11/1983 | Bouck | 4,577,688 A | 3/1986 | Gassmann et al. |
| 4,415,034 A | 11/1983 | Bouck | 4,579,176 A | 4/1986 | Davies et al. |
| 4,417,620 A | 11/1983 | Shafir | 4,589,487 A | 5/1986 | Venkatesan et al. |
| 4,418,752 A | 12/1983 | Boyer et al. | 4,595,057 A | 6/1986 | Deming et al. |
| 4,423,779 A | 1/1984 | Livingston | 4,597,441 A | 7/1986 | Ware et al. |
| 4,427,528 A | 1/1984 | Lindörfer et al. | 4,597,443 A | 7/1986 | Shu et al. |
| 4,429,744 A | 2/1984 | Cook | 4,598,770 A | 7/1986 | Shu et al. |
| 4,429,745 A | 2/1984 | Cook | 4,601,337 A | 7/1986 | Lau et al. |
| 4,434,851 A | 3/1984 | Haynes, Jr. et al. | 4,601,338 A | 7/1986 | Prats et al. |
| 4,441,555 A | 4/1984 | Shu | 4,607,695 A | 8/1986 | Weber |
| 4,444,257 A | 4/1984 | Stine | 4,607,699 A | 8/1986 | Stephens |
| 4,444,261 A | 4/1984 | Islip | 4,607,700 A | 8/1986 | Duerksen et al. |
| 4,445,573 A | 5/1984 | McCaleb | 4,610,304 A | 9/1986 | Doscher |
| 4,448,251 A | 5/1984 | Stine | 4,612,989 A | 9/1986 | Rakach et al. |
| 4,450,909 A | 5/1984 | Sacuta | 4,612,990 A | 9/1986 | Shu |
| 4,450,911 A | 5/1984 | Shu et al. | 4,615,391 A | 10/1986 | Garthoffner |
| 4,452,491 A | 6/1984 | Seglin et al. | 4,620,592 A | 11/1986 | Perkins |
| 4,453,597 A | 6/1984 | Brown et al. | 4,620,593 A | 11/1986 | Haagensen |
| 4,456,065 A | 6/1984 | Heim et al. | 4,635,720 A | 1/1987 | Chew |
| 4,456,066 A | 6/1984 | Shu | 4,637,461 A | 1/1987 | Hight |
| 4,456,068 A | 6/1984 | Burrill, Jr. et al. | 4,637,466 A | 1/1987 | Hawkins et al. |
| 4,458,756 A | 7/1984 | Clark | 4,640,352 A | 2/1987 | Vanmeurs et al. |
| 4,458,759 A | 7/1984 | Isaacs et al. | 4,640,359 A | 2/1987 | Livesey et al. |
| 4,460,044 A | 7/1984 | Porter | 4,641,710 A | 2/1987 | Klinger |
| 4,465,137 A | 8/1984 | Sustek, Jr. et al. | 4,645,003 A | 2/1987 | Huang et al. |
| 4,466,485 A | 8/1984 | Shu | 4,645,004 A | 2/1987 | Bridges et al. |
| 4,469,177 A | 9/1984 | Venkatesan | 4,646,824 A | 3/1987 | Huang et al. |
| 4,471,839 A | 9/1984 | Snavely et al. | 4,648,835 A | 3/1987 | Eisenhawer et al. |
| 4,473,114 A | 9/1984 | Bell et al. | 4,651,825 A | 3/1987 | Wilson |
| 4,475,592 A | 10/1984 | Pachovsky | 4,651,826 A | 3/1987 | Holmes |
| 4,475,595 A | 10/1984 | Watkins et al. | 4,653,583 A | 3/1987 | Huang et al. |
| 4,478,280 A | 10/1984 | Hopkins et al. | 4,662,438 A | 5/1987 | Taflove et al. |
| 4,478,705 A | 10/1984 | Ganguli | 4,662,440 A | 5/1987 | Harmon et al. |
| 4,480,689 A | 11/1984 | Wunderlich | 4,662,441 A | 5/1987 | Huang et al. |

| Patent No. | Date | Inventor |
|---|---|---|
| 4,665,989 A | 5/1987 | Wilson |
| 4,667,739 A | 5/1987 | Van Meurs et al. |
| 4,676,313 A | 6/1987 | Rinaldi |
| 4,679,626 A | 7/1987 | Perkins |
| 4,682,652 A | 7/1987 | Huang et al. |
| 4,682,653 A | 7/1987 | Angstadt |
| 4,685,515 A | 8/1987 | Huang et al. |
| 4,687,058 A | 8/1987 | Casad et al. |
| 4,690,215 A | 9/1987 | Roberts et al. |
| 4,691,773 A | 9/1987 | Ward et al. |
| 4,693,311 A | 9/1987 | Muijs et al. |
| 4,694,907 A | 9/1987 | Stahl et al. |
| 4,697,642 A | 10/1987 | Vogel |
| 4,699,213 A | 10/1987 | Fleming |
| 4,700,779 A | 10/1987 | Huang et al. |
| 4,702,314 A | 10/1987 | Huang et al. |
| 4,702,317 A | 10/1987 | Shen |
| 4,705,108 A | 11/1987 | Little et al. |
| 4,706,751 A | 11/1987 | Gondouin |
| 4,707,230 A | 11/1987 | Ajami |
| 4,718,485 A | 1/1988 | Brown et al. |
| 4,718,489 A | 1/1988 | Hallam et al. |
| 4,727,489 A | 2/1988 | Frazier et al. |
| 4,727,937 A | 3/1988 | Shum et al. |
| 4,739,831 A | 4/1988 | Settlemeyer et al. |
| 4,753,293 A | 6/1988 | Bohn |
| 4,756,369 A | 7/1988 | Jennings, Jr. et al. |
| 4,757,833 A | 7/1988 | Danley |
| 4,759,571 A | 7/1988 | Stone et al. |
| 4,766,958 A | 8/1988 | Faecke |
| 4,769,161 A | 9/1988 | Angstadt |
| 4,775,450 A | 10/1988 | Ajami |
| 4,782,901 A | 11/1988 | Phelps et al. |
| 4,785,028 A | 11/1988 | Hoskin et al. |
| 4,785,883 A | 11/1988 | Hoskin et al. |
| 4,787,452 A | 11/1988 | Jennings, Jr. |
| 4,793,415 A | 12/1988 | Holmes et al. |
| 4,804,043 A | 2/1989 | Shu et al. |
| 4,809,780 A | 3/1989 | Shen |
| 4,813,483 A | 3/1989 | Ziegler |
| 4,817,711 A | 4/1989 | Jeambey |
| 4,817,714 A | 4/1989 | Jones |
| 4,818,370 A | 4/1989 | Gregoli et al. |
| 4,828,030 A | 5/1989 | Jennings, Jr. |
| 4,828,031 A | 5/1989 | Davis |
| 4,828,032 A | 5/1989 | Teletzke et al. |
| 4,834,174 A | 5/1989 | Vandevier |
| 4,834,179 A | 5/1989 | Kokolis et al. |
| 4,844,155 A | 7/1989 | Megyeri et al. |
| 4,846,275 A | 7/1989 | McKay |
| 4,850,429 A | 7/1989 | Mims et al. |
| 4,856,586 A | 8/1989 | Phelps et al. |
| 4,856,587 A | 8/1989 | Nielson |
| 4,860,827 A | 8/1989 | Lee et al. |
| 4,861,263 A | 8/1989 | Schirmer |
| 4,867,238 A | 9/1989 | Bayless et al. |
| 4,869,830 A | 9/1989 | Konak et al. |
| 4,874,043 A | 10/1989 | Joseph et al. |
| 4,884,635 A | 12/1989 | McKay et al. |
| 4,886,118 A | 12/1989 | Van Meurs et al. |
| 4,892,146 A | 1/1990 | Shen |
| 4,895,085 A | 1/1990 | Chips |
| 4,895,206 A | 1/1990 | Price |
| 4,896,725 A | 1/1990 | Parker et al. |
| 4,901,795 A | 2/1990 | Phelps et al. |
| 4,903,766 A | 2/1990 | Shu |
| 4,903,768 A | 2/1990 | Shu |
| 4,903,770 A | 2/1990 | Friedman et al. |
| 4,915,170 A | 4/1990 | Hoskin |
| 4,919,206 A | 4/1990 | Freeman et al. |
| 4,926,941 A | 5/1990 | Glandt et al. |
| 4,926,943 A | 5/1990 | Hoskin |
| 4,928,766 A | 5/1990 | Hoskin |
| 4,930,454 A | 6/1990 | Latty et al. |
| 4,940,091 A | 7/1990 | Shu et al. |
| 4,945,984 A | 8/1990 | Price |
| 4,947,933 A | 8/1990 | Jones et al. |
| 4,961,467 A | 10/1990 | Pebdani |
| 4,962,814 A | 10/1990 | Alameddine |
| 4,964,461 A | 10/1990 | Shu |
| 4,966,235 A | 10/1990 | Gregoli et al. |
| 4,969,520 A | 11/1990 | Jan et al. |
| 4,974,677 A | 12/1990 | Shu |
| 4,982,786 A | 1/1991 | Jennings, Jr. |
| 4,983,364 A | 1/1991 | Buck et al. |
| 4,991,652 A | 2/1991 | Hoskin et al. |
| 5,010,953 A | 4/1991 | Friedman et al. |
| 5,013,462 A | 5/1991 | Danley |
| 5,014,787 A | 5/1991 | Duerksen |
| 5,016,709 A | 5/1991 | Combe et al. |
| 5,016,710 A | 5/1991 | Renard et al. |
| 5,016,713 A | 5/1991 | Sanchez et al. |
| 5,024,275 A | 6/1991 | Anderson et al. |
| 5,027,898 A | 7/1991 | Naae |
| 5,036,915 A | 8/1991 | Wyganowski |
| 5,036,917 A | 8/1991 | Jennings, Jr. et al. |
| 5,036,918 A | 8/1991 | Jennings, Jr. et al. |
| 5,040,605 A | 8/1991 | Showalter |
| 5,042,579 A | 8/1991 | Glandt et al. |
| 5,046,559 A | 9/1991 | Glandt |
| 5,046,560 A | 9/1991 | Teletzke et al. |
| 5,052,482 A | 10/1991 | Gondouin |
| 5,054,551 A | 10/1991 | Duerksen |
| 5,056,596 A | 10/1991 | McKay et al. |
| 5,058,681 A | 10/1991 | Reed |
| 5,060,726 A | 10/1991 | Glandt et al. |
| 5,065,819 A | 11/1991 | Kasevich |
| 5,083,612 A | 1/1992 | Ashrawi |
| 5,083,613 A | 1/1992 | Gregoli et al. |
| 5,085,275 A | 2/1992 | Gondouin |
| 5,099,918 A | 3/1992 | Bridges et al. |
| 5,101,898 A | 4/1992 | Hong |
| 5,105,880 A | 4/1992 | Shen |
| 5,109,927 A | 5/1992 | Supernaw et al. |
| 5,123,485 A | 6/1992 | Vasicek et al. |
| 5,131,471 A | 7/1992 | Duerksen et al. |
| 5,145,002 A | 9/1992 | McKay |
| 5,145,003 A | 9/1992 | Duerksen |
| 5,148,869 A | 9/1992 | Sanchez |
| 5,156,214 A | 10/1992 | Hoskin et al. |
| 5,167,280 A | 12/1992 | Sanchez et al. |
| 5,172,763 A | 12/1992 | Mohammadi et al. |
| 5,174,377 A | 12/1992 | Kumar |
| 5,178,217 A | 1/1993 | Mohammadi et al. |
| 5,186,256 A | 2/1993 | Downs |
| 5,199,490 A | 4/1993 | Surles et al. |
| 5,201,815 A | 4/1993 | Hong et al. |
| 5,215,146 A | 6/1993 | Sanchez |
| 5,215,149 A | 6/1993 | Lu |
| 5,236,039 A | 8/1993 | Edelstein et al. |
| 5,238,066 A | 8/1993 | Beattie et al. |
| 5,246,071 A | 9/1993 | Chu |
| 5,247,993 A | 9/1993 | Sarem et al. |
| 5,252,226 A | 10/1993 | Justice |
| 5,271,693 A | 12/1993 | Johnson et al. |
| 5,273,111 A | 12/1993 | Brannan et al. |
| 5,277,830 A | 1/1994 | Hoskin et al. |
| 5,279,367 A | 1/1994 | Osterloh |
| 5,282,508 A | 2/1994 | Ellingsen et al. |
| 5,289,881 A | 3/1994 | Schuh |
| 5,293,936 A | 3/1994 | Bridges |
| 5,295,540 A | 3/1994 | Djabbarah et al. |
| 5,297,627 A | 3/1994 | Sanchez et al. |
| 5,305,209 A | 4/1994 | Stein et al. |
| 5,305,829 A | 4/1994 | Kumar |
| 5,318,124 A | 6/1994 | Ong et al. |

| | | | | | | |
|---|---|---|---|---|---|---|
| 5,325,918 | A | 7/1994 | Berryman et al. | 6,109,358 | A | 8/2000 | McPhee et al. |
| 5,339,897 | A | 8/1994 | Leaute | 6,148,911 | A | 11/2000 | Gipson et al. |
| 5,339,898 | A | 8/1994 | Yu et al. | 6,158,510 | A | 12/2000 | Bacon et al. |
| 5,339,904 | A | 8/1994 | Jennings, Jr. et al. | 6,158,513 | A | 12/2000 | Nistor et al. |
| 5,350,014 | A | 9/1994 | McKay | 6,167,966 | B1 | 1/2001 | Ayasse et al. |
| 5,358,054 | A | 10/1994 | Bert | 6,173,775 | B1 | 1/2001 | Elias et al. |
| 5,361,845 | A | 11/1994 | Jamaluddin et al. | 6,186,232 | B1 | 2/2001 | Isaacs et al. |
| 5,377,757 | A | 1/1995 | Ng | 6,189,611 | B1 | 2/2001 | Kasevich |
| 5,404,950 | A | 4/1995 | Ng et al. | 6,205,289 | B1 | 3/2001 | Kobro |
| 5,407,009 | A | 4/1995 | Butler et al. | 6,230,814 | B1 | 5/2001 | Nasr et al. |
| 5,411,086 | A | 5/1995 | Burcham et al. | 6,257,334 | B1 | 7/2001 | Cyr et al. |
| 5,411,089 | A | 5/1995 | Vinegar et al. | 6,263,965 | B1 | 7/2001 | Schmidt et al. |
| 5,411,094 | A | 5/1995 | Northrop | 6,266,619 | B1 | 7/2001 | Thomas et al. |
| 5,413,175 | A | 5/1995 | Edmunds | 6,276,457 | B1 | 8/2001 | Moffatt et al. |
| 5,415,231 | A | 5/1995 | Northrop et al. | 6,285,014 | B1 | 9/2001 | Beck et al. |
| 5,417,283 | A | 5/1995 | Ejiogu et al. | 6,305,472 | B2 | 10/2001 | Richardson et al. |
| 5,431,224 | A | 7/1995 | Laali | 6,318,464 | B1 | 11/2001 | Mokrys |
| 5,433,271 | A | 7/1995 | Vinegar et al. | 6,325,147 | B1 | 12/2001 | Doerler et al. |
| 5,449,038 | A | 9/1995 | Horton et al. | 6,328,104 | B1 | 12/2001 | Graue |
| 5,450,902 | A | 9/1995 | Matthews | 6,353,706 | B1 | 3/2002 | Bridges |
| 5,456,315 | A | 10/1995 | Kisman et al. | 6,356,844 | B2 | 3/2002 | Thomas et al. |
| 5,458,193 | A | 10/1995 | Horton et al. | 6,357,526 | B1 | 3/2002 | Abdel-Halim et al. |
| 5,464,309 | A | 11/1995 | Mancini et al. | 6,409,226 | B1 | 6/2002 | Slack et al. |
| 5,483,801 | A | 1/1996 | Craze | 6,412,557 | B1 | 7/2002 | Ayasse et al. |
| 5,503,226 | A | 4/1996 | Wadleigh | 6,413,016 | B1 | 7/2002 | Nelson et al. |
| 5,511,616 | A | 4/1996 | Bert | 6,454,010 | B1 | 9/2002 | Thomas et al. |
| 5,513,705 | A | 5/1996 | Djabbarah et al. | 6,536,523 | B1 | 3/2003 | Kresnyak et al. |
| 5,531,272 | A | 7/1996 | Ng et al. | 6,554,067 | B1 | 4/2003 | Davies et al. |
| 5,534,186 | A | 7/1996 | Walker et al. | 6,561,274 | B1 | 5/2003 | Hayes et al. |
| 5,547,022 | A | 8/1996 | Juprasert et al. | 6,581,684 | B2 | 6/2003 | Wellington et al. |
| 5,553,974 | A | 9/1996 | Nazarian | 6,588,500 | B2 | 7/2003 | Lewis |
| 5,560,737 | A | 10/1996 | Schuring et al. | 6,591,906 | B2 | 7/2003 | Wellington et al. |
| 5,565,139 | A | 10/1996 | Walker et al. | 6,591,908 | B2 | 7/2003 | Nasr |
| 5,589,775 | A | 12/1996 | Kuckes | 6,607,036 | B2 | 8/2003 | Ranson et al. |
| 5,607,016 | A | 3/1997 | Butler | 6,631,761 | B2 | 10/2003 | Yuan et al. |
| 5,607,018 | A | 3/1997 | Schuh | 6,662,872 | B2 | 12/2003 | Gutek et al. |
| 5,626,191 | A | 5/1997 | Greaves et al. | 6,666,666 | B1 | 12/2003 | Gilbert et al. |
| 5,626,193 | A | 5/1997 | Nzekwu et al. | 6,681,859 | B2 | 1/2004 | Hill |
| 5,635,139 | A | 6/1997 | Holst et al. | 6,688,387 | B1 | 2/2004 | Wellington et al. |
| 5,650,128 | A | 7/1997 | Holst et al. | 6,702,016 | B2 | 3/2004 | de Rouffignac et al. |
| 5,660,500 | A | 8/1997 | Marsden, Jr. et al. | 6,712,136 | B2 | 3/2004 | de Rouffignac et al. |
| 5,677,267 | A | 10/1997 | Suarez et al. | 6,712,150 | B1 | 3/2004 | Misselbrook et al. |
| 5,682,613 | A | 11/1997 | Dinatale | 6,715,546 | B2 | 4/2004 | Vinegar et al. |
| 5,709,505 | A | 1/1998 | Williams et al. | 6,715,547 | B2 | 4/2004 | Vinegar et al. |
| 5,713,415 | A | 2/1998 | Bridges | 6,715,548 | B2 | 4/2004 | Wellington et al. |
| 5,738,937 | A | 4/1998 | Baychar | 6,715,549 | B2 | 4/2004 | Wellington et al. |
| 5,765,964 | A | 6/1998 | Calcote et al. | 6,719,047 | B2 | 4/2004 | Fowler et al. |
| 5,771,973 | A | 6/1998 | Jensen et al. | 6,722,429 | B2 | 4/2004 | de Rouffignac et al. |
| 5,788,412 | A | 8/1998 | Jatkar | 6,722,431 | B2 | 4/2004 | Karanikas et al. |
| RE35,891 | E | 9/1998 | Jamaluddin et al. | 6,725,920 | B2 | 4/2004 | Zhang et al. |
| 5,803,171 | A | 9/1998 | McCaffery et al. | 6,729,394 | B1 | 5/2004 | Hassan et al. |
| 5,803,178 | A | 9/1998 | Cain | 6,729,395 | B2 | 5/2004 | Shahin, Jr. et al. |
| 5,813,799 | A | 9/1998 | Calcote et al. | 6,729,397 | B2 | 5/2004 | Zhang et al. |
| 5,823,631 | A | 10/1998 | Herbolzheimer et al. | 6,729,401 | B2 | 5/2004 | Vinegar et al. |
| 5,860,475 | A | 1/1999 | Ejiogu et al. | 6,732,794 | B2 | 5/2004 | Wellington et al. |
| 5,899,274 | A | 5/1999 | Frauenfeld et al. | 6,732,795 | B2 | 5/2004 | de Rouffignac et al. |
| 5,923,170 | A | 7/1999 | Kuckes | 6,732,796 | B2 | 5/2004 | Vinegar et al. |
| 5,931,230 | A | 8/1999 | Lesage et al. | 6,733,636 | B1 | 5/2004 | Heins |
| 5,941,081 | A | 8/1999 | Burgener | 6,736,215 | B2 | 5/2004 | Maher et al. |
| 5,957,202 | A | 9/1999 | Huang | 6,736,222 | B2 | 5/2004 | Kuckes et al. |
| 5,984,010 | A | 11/1999 | Elias et al. | 6,739,394 | B2 | 5/2004 | Vinegar et al. |
| 6,000,471 | A | 12/1999 | Langset | 6,742,588 | B2 | 6/2004 | Wellington et al. |
| 6,004,451 | A | 12/1999 | Rock et al. | 6,742,593 | B2 | 6/2004 | Vinegar et al. |
| 6,012,520 | A | 1/2000 | Yu et al. | 6,745,831 | B2 | 6/2004 | de Rouffignac et al. |
| 6,015,015 | A | 1/2000 | Luft et al. | 6,745,832 | B2 | 6/2004 | Wellington et al. |
| 6,016,867 | A | 1/2000 | Gregoli et al. | 6,745,837 | B2 | 6/2004 | Wellington et al. |
| 6,016,868 | A | 1/2000 | Gregoli et al. | 6,755,246 | B2 | 6/2004 | Chen et al. |
| 6,026,914 | A | 2/2000 | Adams et al. | 6,758,268 | B2 | 7/2004 | Vinegar et al. |
| 6,039,121 | A | 3/2000 | Kisman | 6,782,947 | B2 | 8/2004 | de Rouffignac et al. |
| 6,048,810 | A | 4/2000 | Baychar | 6,789,625 | B2 | 9/2004 | de Rouffignac et al. |
| 6,050,335 | A | 4/2000 | Parsons | 6,794,864 | B2 | 9/2004 | Mirotchnik et al. |
| 6,056,057 | A | 5/2000 | Vinegar et al. | 6,805,195 | B2 | 10/2004 | Vinegar et al. |
| 6,102,122 | A | 8/2000 | de Rouffignac | 6,814,141 | B2 | 11/2004 | Huh et al. |

| | | |
|---|---|---|
| 6,853,921 B2 | 2/2005 | Thomas et al. |
| 7,079,952 B2 | 7/2006 | Thomas et al. |
| 2001/0009830 A1 | 7/2001 | Baychar |
| 2001/0017206 A1 | 8/2001 | Davidson et al. |
| 2001/0018975 A1 | 9/2001 | Richardson et al. |
| 2002/0016679 A1 | 2/2002 | Thomas et al. |
| 2002/0029881 A1 | 3/2002 | de Rouffignac et al. |
| 2002/0033253 A1 | 3/2002 | Rouffignac et al. |
| 2002/0038710 A1 | 4/2002 | Maher et al. |
| 2002/0040779 A1 | 4/2002 | Wellington et al. |
| 2002/0046838 A1 | 4/2002 | Karanikas et al. |
| 2002/0056551 A1 | 5/2002 | Wellington et al. |
| 2002/0104651 A1 | 8/2002 | McClung, III |
| 2002/0148608 A1 | 10/2002 | Shaw |
| 2002/0157831 A1 | 10/2002 | Kurlenya et al. |
| 2003/0000711 A1 | 1/2003 | Gutek et al. |
| 2003/0009297 A1 | 1/2003 | Mirotchnik et al. |
| 2003/0015458 A1 | 1/2003 | Nenniger et al. |
| 2003/0042018 A1 | 3/2003 | Huh et al. |
| 2003/0044299 A1 | 3/2003 | Thomas et al. |
| 2003/0051875 A1 | 3/2003 | Wilson |
| 2003/0062159 A1 | 4/2003 | Nasr |
| 2003/0062717 A1 | 4/2003 | Thomas et al. |
| 2003/0079877 A1 | 5/2003 | Wellington et al. |
| 2003/0080604 A1 | 5/2003 | Vinegar et al. |
| 2003/0090424 A1 | 5/2003 | Brune et al. |
| 2003/0098605 A1 | 5/2003 | Vinegar et al. |
| 2003/0102123 A1 | 6/2003 | Wittle et al. |
| 2003/0102124 A1 | 6/2003 | Vinegar et al. |
| 2003/0102126 A1 | 6/2003 | Sumnu-Dindoruk et al. |
| 2003/0102130 A1 | 6/2003 | Vinegar et al. |
| 2003/0110017 A1 | 6/2003 | Guthrie et al. |
| 2003/0111223 A1 | 6/2003 | Rouffignac et al. |
| 2003/0116315 A1 | 6/2003 | Wellington et al. |
| 2003/0127226 A1 | 7/2003 | Heins |
| 2003/0129895 A1 | 7/2003 | Baychar |
| 2003/0131993 A1 | 7/2003 | Zhang et al. |
| 2003/0131994 A1 | 7/2003 | Vinegar et al. |
| 2003/0131995 A1 | 7/2003 | de Rouffignac et al. |
| 2003/0131996 A1 | 7/2003 | Vinegar et al. |
| 2003/0136476 A1 | 7/2003 | O'Hara et al. |
| 2003/0141053 A1 | 7/2003 | Yuan et al. |
| 2003/0141065 A1 | 7/2003 | Karanikas et al. |
| 2003/0141066 A1 | 7/2003 | Karanikas et al. |
| 2003/0141067 A1 | 7/2003 | Rouffignac et al. |
| 2003/0141068 A1 | 7/2003 | de Rouffignac et al. |
| 2003/0155111 A1 | 8/2003 | Vinegar et al. |
| 2003/0159828 A1 | 8/2003 | Howard et al. |
| 2003/0164234 A1 | 9/2003 | de Rouffignac et al. |
| 2003/0164239 A1 | 9/2003 | Wellington et al. |
| 2003/0173072 A1 | 9/2003 | Vinegar et al. |
| 2003/0173080 A1 | 9/2003 | Berchenko et al. |
| 2003/0173081 A1 | 9/2003 | Vinegar et al. |
| 2003/0173082 A1 | 9/2003 | Vinegar et al. |
| 2003/0173086 A1 | 9/2003 | Howard et al. |
| 2003/0178191 A1 | 9/2003 | Maher et al. |
| 2003/0183390 A1 | 10/2003 | Veenstra et al. |
| 2003/0192691 A1 | 10/2003 | Vinegar et al. |
| 2003/0192693 A1 | 10/2003 | Wellington |
| 2003/0196788 A1 | 10/2003 | Vinegar et al. |
| 2003/0196789 A1 | 10/2003 | Wellington et al. |
| 2003/0196801 A1 | 10/2003 | Vinegar et al. |
| 2003/0196810 A1 | 10/2003 | Vinegar et al. |
| 2003/0201098 A1 | 10/2003 | Karanikas et al. |
| 2003/0205378 A1 | 11/2003 | Wellington et al. |
| 2003/0209348 A1 | 11/2003 | Ward et al. |
| 2003/0223896 A1 | 12/2003 | Gilbert et al. |
| 2004/0007500 A1 | 1/2004 | Kresnyak |
| 2004/0020642 A1 | 2/2004 | Vinegar et al. |
| 2004/0040715 A1 | 3/2004 | Wellington et al. |
| 2004/0050547 A1 | 3/2004 | Limbach |
| 2004/0112586 A1 | 6/2004 | Matthews et al. |
| 2004/0116304 A1 | 6/2004 | Wu et al. |
| 2004/0118783 A1 | 6/2004 | Myers et al. |
| 2004/0140095 A1 | 7/2004 | Vinegar et al. |
| 2004/0140096 A1 | 7/2004 | Sandberg et al. |
| 2004/0144540 A1 | 7/2004 | Sandberg et al. |
| 2004/0144541 A1 | 7/2004 | Picha et al. |
| 2004/0145969 A1 | 7/2004 | Bai et al. |
| 2004/0146288 A1 | 7/2004 | Vinegar et al. |
| 2004/0154793 A1 | 8/2004 | Zapadinski |
| 2004/0177966 A1 | 9/2004 | Vinegar et al. |
| 2004/0204324 A1 | 10/2004 | Baltoiu et al. |
| 2004/0211554 A1 | 10/2004 | Vinegar et al. |
| 2004/0211569 A1 | 10/2004 | Vinegar et al. |
| 2004/0261729 A1 | 12/2004 | Sarkar |
| 2005/0006097 A1 | 1/2005 | Sandberg et al. |
| 2005/0026094 A1 | 2/2005 | Sanmiguel et al. |
| 2005/0038603 A1 | 2/2005 | Thomas et al. |

FOREIGN PATENT DOCUMENTS

| | | |
|---|---|---|
| EP | 0 144 203 A2 | 6/1985 |
| EP | 0 158 486 A1 | 10/1985 |
| EP | 0 226 275 A1 | 6/1987 |
| EP | 0 261 793 A1 | 3/1988 |
| EP | 0 269 231 A1 | 6/1988 |
| EP | 0 283 602 A1 | 9/1988 |
| EP | 0 295 712 A2 | 12/1988 |
| EP | 0 341 976 A2 | 11/1989 |
| EP | 0 387 846 A1 | 9/1990 |
| EP | 0 420 656 A2 | 4/1991 |
| EP | 0 747 142 A1 | 12/1996 |
| FR | 2 852 713 | 9/2004 |
| GB | 1 457 696 | 12/1976 |
| GB | 1 463 444 | 2/1977 |
| GB | 2 031 975 | 4/1980 |
| GB | 1 585 742 | 3/1981 |
| GB | 2 062 065 | 5/1981 |
| GB | 2 138 869 | 10/1984 |
| GB | 2 156 400 | 10/1985 |
| GB | 2 164 978 | 4/1986 |
| GB | 2 177 141 | 1/1987 |
| GB | 2 196 665 | 5/1988 |
| GB | 2 219 818 | 12/1989 |
| GB | 2 257 184 | 1/1993 |
| GB | 2 272 465 | 5/1994 |
| GB | 2 286 001 | 8/1995 |
| GB | 2 340 152 | 2/2000 |
| GB | 2 357 528 | 6/2001 |
| GB | 2 362 333 | 11/2001 |
| GB | 2 363 587 | 1/2002 |
| GB | 2 391 890 | 2/2004 |
| GB | 2 391 891 | 2/2004 |
| GB | 2 403 443 | 12/2004 |
| WO | WO 82/01214 | 4/1982 |
| WO | WO 86/03251 | 6/1986 |
| WO | WO 87/07293 | 12/1987 |
| WO | WO 89/12728 | 12/1989 |
| WO | WO 92/18748 | 10/1992 |
| WO | WO 93/16338 | 8/1993 |
| WO | WO 93/23134 | 11/1993 |
| WO | WO 94/21886 | 9/1994 |
| WO | WO 94/21889 | 9/1994 |
| WO | WO 95/16512 | 6/1995 |
| WO | WO 96/16729 | 6/1996 |
| WO | WO 96/32566 | 10/1996 |
| WO | WO 96/35858 | 11/1996 |
| WO | WO 97/01017 | 1/1997 |
| WO | WO 97/12119 | 4/1997 |
| WO | WO 97/35090 | 9/1997 |
| WO | WO 98/04807 | 2/1998 |
| WO | WO 98/37306 | 8/1998 |
| WO | WO 98/40603 | 9/1998 |
| WO | WO 98/40605 | 9/1998 |
| WO | WO 98/45733 | 10/1998 |

| | | |
|---|---|---|
| WO | WO 98/50679 | 11/1998 |
| WO | WO 99/30002 | 6/1999 |
| WO | WO 99/67503 | 12/1999 |
| WO | WO 99/67504 | 12/1999 |
| WO | WO 99/67505 | 12/1999 |
| WO | WO 00/23688 | 4/2000 |
| WO | WO 00/25002 | 5/2000 |
| WO | WO 00/66882 | 11/2000 |
| WO | WO 00/67930 | 11/2000 |
| WO | WO 01/06089 A1 | 1/2001 |
| WO | WO 01/27439 A1 | 4/2001 |
| WO | WO 01/62603 A2 | 8/2001 |
| WO | WO 01/81239 A2 | 11/2001 |
| WO | WO 01/81505 A1 | 11/2001 |
| WO | WO 01/81710 A1 | 11/2001 |
| WO | WO 01/81715 A2 | 11/2001 |
| WO | WO 01/92673 A2 | 12/2001 |
| WO | WO 01/92684 A1 | 12/2001 |
| WO | WO 01/92768 A2 | 12/2001 |
| WO | WO 02/086018 A2 | 10/2002 |
| WO | WO 02/086276 A2 | 10/2002 |
| WO | WO 03/010415 A1 | 2/2003 |
| WO | WO 03/036033 A1 | 5/2003 |
| WO | WO 03/036038 A2 | 5/2003 |
| WO | WO 03/036039 A1 | 5/2003 |
| WO | WO 03/036043 A2 | 5/2003 |
| WO | WO 03/038230 A2 | 5/2003 |
| WO | WO 03/038233 A1 | 5/2003 |
| WO | WO 03/040513 A2 | 5/2003 |
| WO | WO 03/040762 A1 | 5/2003 |
| WO | WO 03/053603 A2 | 7/2003 |
| WO | WO 03/054351 A1 | 7/2003 |
| WO | WO 03/062596 A1 | 7/2003 |
| WO | WO 03/100257 A1 | 12/2003 |
| WO | WO 2004/038173 A1 | 5/2004 |
| WO | WO 2004/038174 A2 | 5/2004 |
| WO | WO 2004/038175 A1 | 5/2004 |
| WO | WO 2004/050567 A1 | 6/2004 |
| WO | WO 2004/050791 A1 | 6/2004 |
| WO | WO 2004/097159 A2 | 11/2004 |
| WO | WO 2005/007776 A1 | 1/2005 |
| WO | WO 2005/012688 A1 | 2/2005 |
| WO | WO 2006/003118 A1 | 1/2006 |

OTHER PUBLICATIONS

"Downhole Steam-Generator Study, Volume 1, Conception and Feasibility Evaluation, Final Report, Sep. 1978-Sep. 1980," *National Technical Information Service*, DE82018348, Sandia National Labs, Albuquerque, NM, U.S. Department of Commerce, Jun. 1982, 256 pages.

Notification Concerning Transmittal of International Preliminary Report on Patentability, form PCT/IB/326; International Preliminary Report on Patentability, form PCT/IB/373; and Written Opinion of the International Searching Authority, form PCT/ISA/237, mailed Jul. 24, 2008 (7 pages).

K.C. Hong, "Recent Advances in Steamflood Technology," SPE 54078, Copyright 1999, Society of Petroleum Engineers, Inc., 14 pages.

Gary R. Greaser and J. Raul Ortiz, "New Thermal Recovery Technology and Technology Transfer for Successful Heavy Oil Development," SPE 69731, Copyright 2003, Society of Petroleum Engineers, Inc., 7 pages.

A.J. Mulac, J.A. Beyeloer, R.G. Clay, K.R. Darnall, A.B. Donaldson, T.D. Donham, R.L. Fox, D.R. Johnson and R.L. Maxwell, "Project Deep Steam Preliminary Field Test Bakersfield, California," SAND80-2843, Printed Apr. 1981, 62 pages.

Website: http://www.oceaneering.corn/Brochures/MFX%20-%Oceaneering%20Multiflex.pdf, Oceaneering Multiflex, Oceaneering International, Incorporated, printed Nov. 23, 2005, 2 pages.

REAL TIME MONITORING AND CONTROL OF THERMAL RECOVERY OPERATIONS FOR HEAVY OIL RESERVOIRS

TECHNICAL FIELD

This description relates to recovery operations for subsurface geological formations, and more particularly to real time monitoring and control of thermal recovery operations for heavy oil reservoirs.

BACKGROUND

Fluids in hydrocarbon reservoirs may be accessed via wellbores that extend down into the ground toward the targeted reservoirs. In some cases, the hydrocarbon reservoirs may contain fluid with a lower viscosity such that crude oil flows relatively freely from the reservoir, through production tubing, and toward the production equipment at the ground surface. Some hydrocarbon reservoirs comprise fluids having a higher viscosity, which may not freely flow from the reservoir and through the production tubing. These high viscosity fluids in the hydrocarbon reservoirs are occasionally referred to as "heavy oil deposits." In the past, the high viscosity fluids in the hydrocarbon reservoirs remained untapped due to the inability and expense of recovering them. More recently, as the demand for crude oil has increased, commercial operations have expanded to the recovery of such heavy oil deposits.

In some circumstances, the application of heat (e.g., using steam) to the hydrocarbon reservoir may reduce the viscosity of the fluids in the reservoir so as to permit the extraction of crude oil and other liquids from the reservoir. This process is referred to as thermal recovery and can include continuous steam flooding, cyclic steam stimulation, and in-situ combustion. In steam flooding, steam is pumped into injection wells to heat up the reservoir and the heavy oil deposits contained in the reservoir. As a result, heavy oil and other liquids can be recovered through production wells.

Cyclic steam stimulation, or "huff'n puff", involves injecting steam into a well during an injection (or huff) phase that may last days or weeks followed by a soak phase during which the well is shut in for a period of days or weeks to allow the heat to dissipate and to reduce the viscosity of the heavy oil in the reservoir. Finally, during a production (or puff) phase heavy oil is pumped from the same well used for injecting steam.

In-situ combustion involves burning subsurface oil in a reservoir. High temperature air is injected into the reservoir to initiate burning of the subsurface oil, which, in turn, heats up the reservoir and the heavy oil deposits that it contains. Water can also be injected in addition to air. The burning oil heats the water to produce steam, further heating the reservoir, reducing the viscosity of the heavy oil deposits, and allowing heavy oil to be recovered through a production well.

SUMMARY

The described systems and techniques include real-time or right-time monitoring and control of steam production rates and heat content for improved or optimal thermal recovery of heavy oil using feedback from a production well and/or a steam generator to update and tune a reservoir simulator and/or thermal control parameters. In addition, feedback from an economic model can also be used to tune the thermal control parameters to achieve increased or at least relatively optimized economic efficiency.

In one general aspect, input parameters for use in controlling a thermal recovery operation for a reservoir are generated. The input parameters are generated using a reservoir simulator, and the input parameters have a corresponding predicted output of the thermal recovery operation. Data indicative of actual output from the reservoir is received, and the reservoir simulator is manually or automatically updated based on a comparison of the data indicative of the actual output with the predicted output.

Implementations can include one or more of the following features. The reservoir simulator is manually or automatically updated in response to a detected change in the data indicative of the actual output, economic parameters, and/or reservoir conditions, and the change exceeds a corresponding predetermined threshold. The reservoir simulator includes a reservoir model defining multiple reservoir parameters. The thermal recovery operation uses a thermal generator operable to introduce steam into the reservoir. The input parameters define amounts of air, water, and/or fuel. The output of the thermal recovery operation is an amount of water, petroleum, and/or flue gas. The data indicative of actual output from the reservoir is received in real time. Generating input parameters involves performing an automated economic analysis involving the input parameters and the corresponding predicted output. The automated economic analysis involves tuning the input parameters to improve a predicted economic output. The thermal recovery operation involves using a downhole thermal generator. The reservoir simulator is manually or automatically updated by tuning the reservoir simulator based on historical input parameters, corresponding historical data indicative of actual output, and/or predicted output corresponding to the historical input parameters. The reservoir simulator is tuned by adjusting one or more reservoir parameters to improve matching between an actual output from the reservoir and a predicted output from the reservoir.

In another general aspect, a system includes a thermal generator, a reservoir simulator, and a data collection subsystem. The reservoir simulator models thermal operations in a subsurface reservoir. The thermal operations are performed using the thermal generator. The data collection subsystem collects data indicative of output levels predicted using the reservoir simulator and data indicative of actual output levels. The predicted output levels correspond to selected input parameters for the thermal generator. The data indicative of actual output levels is collected in real time. The reservoir simulator is tuned based on a comparison between the collected data indicative of predicted output levels and the collected data indicative of actual output levels.

Implementations can include one or more of the following features. The input parameters for the thermal generator are selected, at least in part, by the reservoir simulator. The reservoir simulator is tuned in response to a detected change in conditions and/or a detected difference between the predicted output levels and the actual output levels. The predicted output levels and the actual output levels define amounts of fluids recovered from the reservoir. The reservoir is a heavy oil reservoir. The thermal generator is a steam generator, and the selected input parameters are control parameters for the steam generator. The steam generator is a surface or a downhole steam generator. An economic model models economic results corresponding to one or more sets of input parameters, and the selected input parameters are determined, at least in part, using the economic model. Sensors detect input levels for the thermal generator, output levels from the thermal generator, and/or output levels from the reservoir.

In another general aspect, a predicted output level for a thermal recovery operation in a reservoir is calculated using a set of reservoir modeling parameters. A set of input parameters corresponding to the predicted output level are identified. Real-time monitoring of an actual output level for the reservoir is performed, and the set of reservoir modeling parameters is updated based on the real-time monitoring of actual output.

Implementations can include one or more of the following features. The set of reservoir modeling parameters are updated based on detected input levels for a surface or a downhole steam generator used in the thermal recovery operation. An economic result associated with one or more set of input parameters is calculated, and the set of input parameters and the corresponding predicted output level are tuned based on the calculated economic result. The set of reservoir modeling parameters are updated in response to identifying a difference in excess of a threshold level between the predicted output level and the actual output level. The predicted output level is a rate and/or a composition of fluids recovered from the reservoir.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
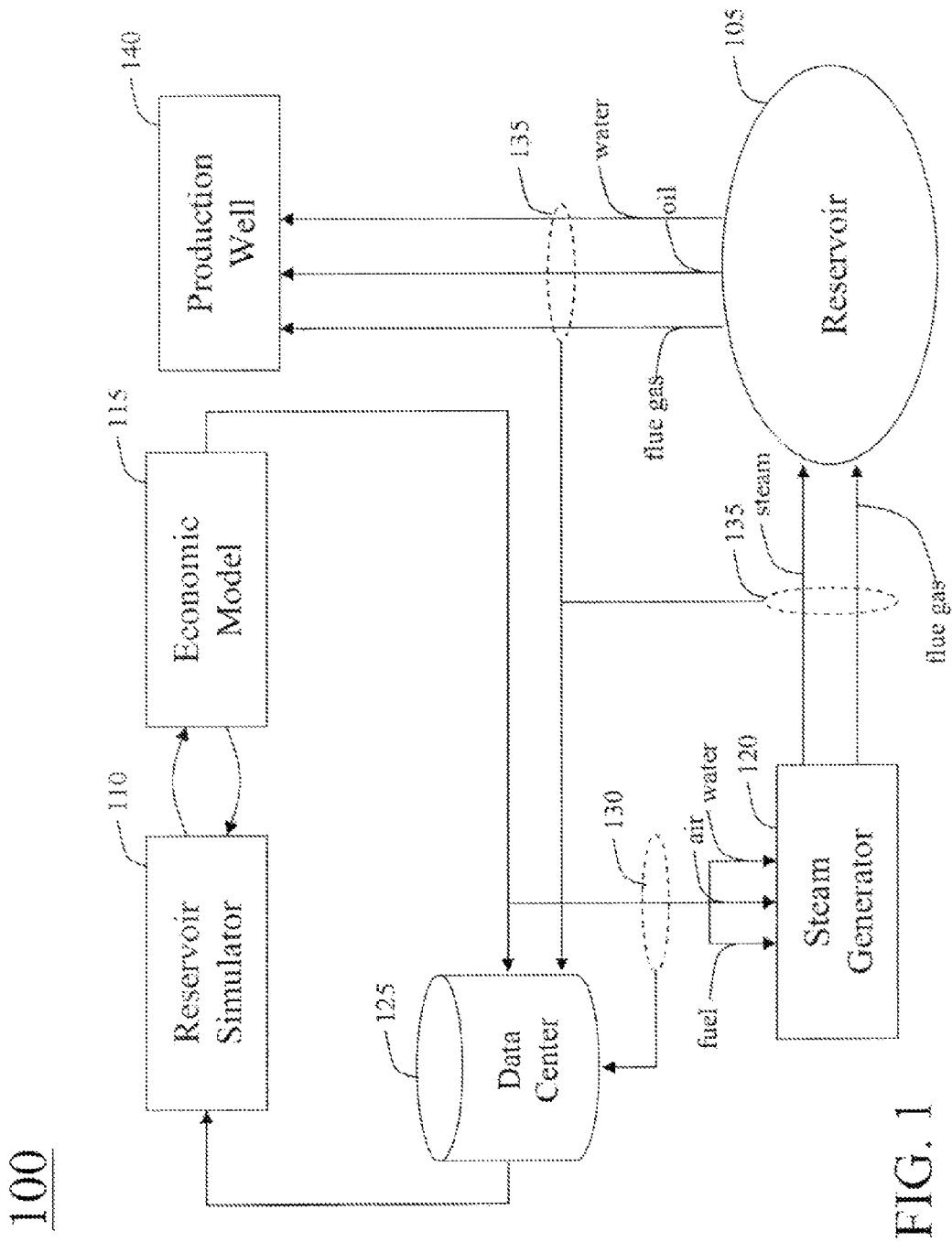
FIG. 1 is a block diagram of a thermal recovery system for a hydrocarbon reservoir, such as a heavy oil reservoir.

FIG. 1 is a block diagram of a thermal recovery system 100 for a hydrocarbon reservoir, such as a heavy oil reservoir 105. The system 100 includes a reservoir simulator 110 for modeling a reservoir description and fluid distribution in the reservoir 105 and predicting recovery based on adjustable inputs. The reservoir simulator 110 is implemented as a software model of the reservoir 105. For example, the reservoir simulator 110 can be implemented using STARS (Steam, Thermal, and Advanced Processes Reservoir Simulator) available from Computer Modeling Group, Ltd., VIP available from Landmark Graphics Corporation, ECLIPSE available from Schlumberger, or some other commercially available or proprietary model. The reservoir simulator 110 can include, for example, a black oil simulator module, a compositional simulator module, a thermal simulator module, and/or other modules, which can work together to produce a more comprehensive model of the reservoir.

The reservoir simulator 110 is initialized with reservoir properties data, which can include geologic data and/or data from production and/or injection wells. The geologic data can include log data, core data from core samples, and spectral density log (SDL) data as well as seismic data. The log data, core data, and SDL data can be pre-processed using computer programs such as Petroworks available from Landmark Graphics, Prizm by Geographix, and DPP by Halliburton to obtain, for example, water and oil saturations, porosity, and clay content. The data can also be processed in stratigraphy programs such as Stratworks available from Landmark Graphics and may be further pre-processed to map the reservoir, such as by using a Z-Map program available from Landmark Graphics.

The geologic data can include conventional or real-time 4D seismic data (i.e., time lapsed seismic, in which incremental differences in seismic data are used to detect dynamic reservoir fluid movement). Seismic data may be collected conventionally by periodically placing an array of hydrophones and geophones at selected places in the reservoir or 4D seismic may be collected on a real-time basis using geophones placed in wells. The seismic data is processed and interpreted using programs, such as Seisworks and Earthcube available from Landmark Graphics to obtain hydrocarbon indicators, stratigraphy, and structure.

Output from pre-processing of the log data, core data, and SDL data and from processing of seismic data is further pre-processed to obtain geostatistics, such as by using Sigmaview available from Landmark Graphics. The geostatistics, the output from processing of seismic data, and mapping of the reservoir are input into Geocellular (Earthmode) programs and processed using, for example, the Stratamodel application available from Landmark Graphics. The output of the Geocellular programs is then upscaled using, for example, Geolink available from Landmark Graphics to obtain a reservoir simulation model, which is a static representation of the reservoir 105. The reservoir simulation model can include porosity, water saturation, oil saturation, gas saturation, viscosity, and permeability.

The production and/or injection data can include downhole production data, seabed production data (for subsea petroleum reservoirs), and surface production data (for land-based petroleum reservoirs). The production/injection data is pre-processed using pressure transient analysis in computer programs such as Saphir by Kappa Engineering or PTA by Geographix to output, for example, reservoir permeability, reservoir pressure, permeability-feet, and the distance to the reservoir boundaries.

Once the reservoir simulator 110 is initialized, it is used to forecast the amount, properties, rate, and composition of oil and other fluids and conditions produced and/or recovered from the reservoir 105 based on adjustable thermal control inputs. For example, the reservoir simulator 110 predicts the temperature and pressure levels, the resulting changes in viscosity of heavy oil, and the ultimate recovery of oil and other fluids that will result from introducing particular amounts of heat into the reservoir 105. Typically, the forecasts, as with the initialization data for the reservoir simulator 110, are specified by ranges because of difficulties in determining precise reservoir properties.

An economic model 115 is used iteratively with the reservoir simulator 110 to analyze profitability based on the cost of inputs and the value of the corresponding predicted recovery. Iterations of the reservoir simulator 110 and the economic model 115 produce a relatively optimized or efficient set of inputs, which can include the properties and rates of air, water, and fuel (e.g., methane or natural gas), for a steam generator 120. The inputs control valves that regulate the rates in which air, water, and fuel are supplied to the steam generator 120. In some implementations, the steam generator 120 can be located at the surface in which case steam is produced using steam boilers and conveyed down a wellbore to a targeted reservoir through a long tube, for example, wellbore casing or production tubing. In other implementations, the steam generator 120 can be a downhole catalyst-based combustor that is wireline-conveyed or a wellhead catalyst-based combustor in which steam is conveyed downhole using tubing. The steam generator 120 can be a combustor produced, for example, by Precision Combustion, Inc. In some implementations, other types of heated-fluid generators or thermal generators can also be used.

The levels of inputs to the steam generator 120 are provided to a data center 125, which stores the input data for correlating with detected conditions in the reservoir 105 and data regarding the resulting recovery from the reservoir 105. The data center 125 can also or alternatively use sensors 130 to detect the actual inputs to the steam generator 120 by, for example, measuring the flow rate of water, fuel, and air inputs. The inputs to the steam generator 120 control the amount (or rate) and properties (e.g., temperature, pressure, and heat content) of steam produced by the steam generator 120 and introduced into the reservoir 105. The amount and properties of the generated steam can have a range that can be determined based on the input parameters for air, fuel, and water. In addition, for downhole steam generators 120, the inputs to the steam generator 120 impact the amount of flue gas (e.g., carbon dioxide, carbon monoxide, and nitrogen) produced and introduced into the reservoir 105. In particular, the stoichiometry of the inputs to the steam generator 120 determine the amount of steam and flue gas as well as affecting the composition and flow rate of heavy oil in the reservoir 105.

The generated steam and any flue gas injected into or produced in the reservoir 105, in turn, facilitate the recovery of fluids from one or more production wells for the reservoir 105. For example, heat from the injected steam decreases the viscosity of heavy oil in the reservoir 105 to allow it to be recovered, along with water (e.g., injected steam that has condensed) and any flue gas from downhole steam generators 120. The rate, amount, composition, and/or properties of water, oil, and flue gas recovered through a production well 140, as well as temperature, pressure, and volume data (e.g., for flue gas, steam, water, etc. in the reservoir), is detected by sensors 135 at the surface or downhole in the production and/or injection wells. For example, the sensors 135 can take periodic samples to determine recovery rates and/or fluid properties and to detect conditions in the reservoir. In some cases, data from surface sensors 135 can be extrapolated to calculate estimated downhole or reservoir values. Data from the sensors 135 is provided to the data center 125 for use in performing analyses. Thus, the data center 125 stores or otherwise has access to data indicating the input parameters for the steam generator 120 and the corresponding output into or from the reservoir 105.

The data center 125 maintains data for one reservoir 105 or, if multiple reservoirs 105 are associated with the data center 125, data for each reservoir 105 is segmented within the data center 125 to enable separate analyses of each reservoir 105. Typically, each reservoir 105 includes multiple injection wells and multiple production wells (e.g., in a five-spot pattern). Input data for each injection well can be individually tracked in cases where different inputs are applied depending on the location of the injection well. Similarly, output data for each production well can also be individually tracked. Individualized input and output data, along with stored knowledge of the relative or absolute locations of the wells, allows inputs to be correlated with outputs on a region-specific or well-specific basis. For example, inputs to a particular injection well can have an effect on the recovery from multiple production wells depending on the distance between the injection well and each production well, the porosity and permeability of the reservoir, and the like.

The data center 125 preprocesses time-varying input and output data to put it in a proper format for use by the reservoir simulator 110, to filter out noise, obtain average amounts, and the like. The input and output data from the data center 125 can be used to compare the actual air, water, and fuel input with the corresponding water, oil, and flue gas that is produced or recovered. In addition, data from the data center 125 can be used to compare rates, compositions, temperatures, and pressures predicted or forecasted by the reservoir simulator 110 with actual rates, compositions, temperatures, and pressures measured using the downhole or surface sensors 135.

The input and output data are collected in real time using, for example, the sensors 130 and 135 and/or control signals for controlling inputs to the steam generator 120. Real time, in this context, can mean that the data is available to the data center 125 on demand or that the data is automatically provided to the data center 125 (e.g., using a communication network that includes a wireline connection to downhole sensors). For example, the data center 125 can be in periodic or continuous communication with the sensors 130 and 135 and can automatically request and/or receive sample readings from the sensors 130 and 135 at predetermined intervals or at intervals determined by the data center 125. The intervals (e.g., every three seconds or every one hour) can be established by the data center 125 or otherwise based on factors such as how quickly sample values change (currently or historically), how input controls have changed or are changing, or the type of parameter being measured. In some implementations, some control signals (e.g., for changing the inputs to the steam generator 120) can be a communication (e.g., voice, text message, or otherwise) to an operator. For example, a control signal can be a message to send an operator to a well to make an adjustment.

Typically, the effect of changes on the inputs can take days or weeks to produce a corresponding change in output. In some implementations, the data center 125 can monitor for changes in the output and correlate those changes with input conditions. In response to a change in excess of a predetermined threshold or at a predetermined or arbitrary time, the system 100 can selectively and automatically update modeling parameters and forecasts of the reservoir simulator 110, change input parameters for the steam generator 120, and/or record such changes and correlations for future analysis. In some implementations, updating of parameters and forecasts, changes in input parameters, and/or recording such changes and correlations can be performed manually. Modeling parameter updates and/or forecasts of the reservoir simulator 110 can also be performed in response to a detected change in the actual output, economic parameters, and/or reservoir conditions, in response to a difference between a predicted output level and an actual output level, or based on some other factor or factors.

In general, the system 100 uses the data stored in the data center 125 for tuning the reservoir simulator 110. In particular, the system 100 includes a feedback loop for evaluating and modifying performance of the reservoir simulator 110. For example, the system 100 compares the actual outputs (e.g., temperature, pressure, steam, flue gas, water, and oil) with the outputs predicted by the reservoir simulator 110 for a certain set of inputs (e.g., air, water, and fuel supplied to the steam generator 120). Based on this comparison, the reservoir simulator 110 can be tuned by adjusting the initial reservoir modeling parameters in an effort to match the reservoir simulator 110 more closely to the actual behavior and characteristics of the reservoir 105, as measured and/or interpolated from the data in the data center 125. In some cases, the system 100 can also compare the actual inputs (i.e., as measured by sensors 130) with the control inputs to tune the control system.

Figure 2:
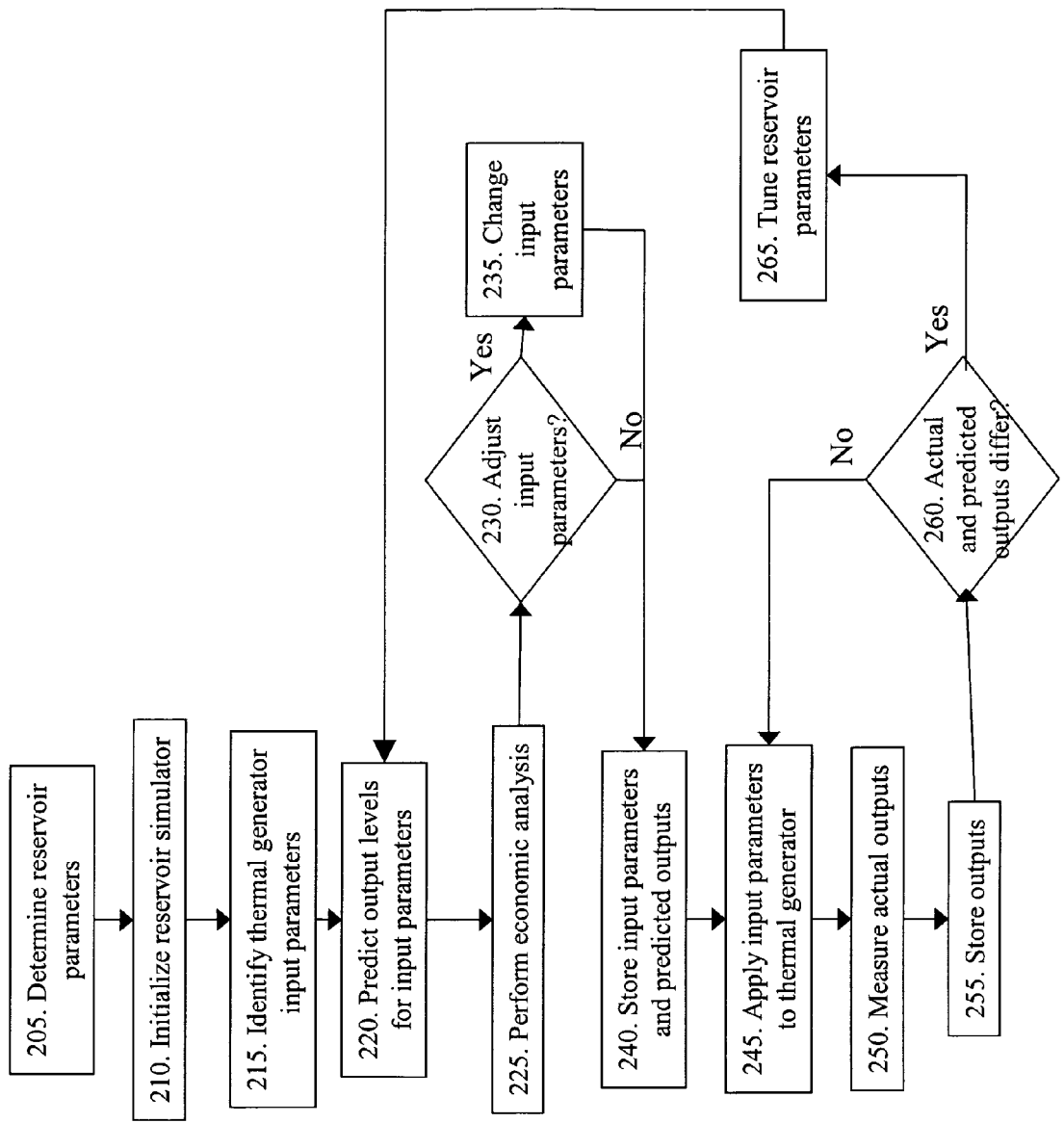
FIG. 2 is a flow diagram of a process for monitoring and controlling thermal recovery operations in a subsurface reservoir.

FIG. 2 is a flow diagram of a process 200 for monitoring and controlling thermal recovery operations in a subsurface reservoir. After a reservoir is identified as a target for thermal recovery operations, reservoir modeling parameters are determined (205). The reservoir modeling parameters generally include values representing static or initial characteristics and properties of the reservoir and the fluid contained therein, such as porosity, permeability, water saturation, oil saturation, gas saturation, viscosity (e.g., of the oil), temperature, and pressure. The reservoir modeling parameters can include characteristics and properties defining a prediction of how the reservoir will respond to changing conditions (e.g., changes in thermal conditions, composition, or pressure).

The reservoir modeling parameters can be determined using core samples, logs, information from production, injection, and/or test wells, seismic analyses, and the like. The reservoir modeling parameters can be defined as a range or distribution curve, which represents an uncertainty in the precise reservoir characteristics. For example, if a core sample suggests a thirty percent porosity for a particular reservoir, the modeling parameter for porosity might be a range from twenty-eight to thirty-two percent to account for sampling errors and/or for potential or statistically probable variations throughout the reservoir.

The reservoir modeling parameters are used to initialize a reservoir simulator (210). The reservoir modeling parameters enable the reservoir simulator to model the state of the reservoir, including any fluids contained in the reservoir, and predict how the reservoir will react responsive to changes of conditions in the reservoir. The reservoir simulator can include different modules that model different aspects of the reservoir (e.g., a black oil module for reservoirs that contain a relatively small amount of gas, a compositional module for reservoirs that contain more gas, and a thermal module for modeling the effects of introducing heat into the reservoir).

An initial set of input parameters are identified (215). The input parameters can be selected arbitrarily or based on some preliminary prediction, past experience, or empirical data relating to the level of inputs necessary to produce favorable results and/or output. The input parameters generally include rates, relative or absolute proportions, or other measures of inputs to a thermal process used to introduce heat into the reservoir. For example, the inputs can include relative amounts of water, fuel in the form of methane or natural gas, and air that are supplied to a steam generator that produces steam in a wellbore or for injection into the reservoir. In some cases, the input parameters can be defined as ranges or distributions to provide a starting point for subsequent economic analysis and/or to account for imprecise delivery or control systems, fluctuations in rates, efficiency variations in the thermal process, and the like.

The reservoir simulator predicts output levels corresponding to the current set of input parameters (220). The output levels can include outputs from a thermal generator (e.g., steam and flue gas), changes in reservoir conditions (e.g., temperature and pressure in the reservoir and composition and viscosity of fluids in the reservoir) resulting from the thermal generator output, and outputs (e.g., rates and compositions of fluids) that are recovered from the reservoir (e.g., through a production well). In general, the focus of reservoir simulation is to model changes in the fluids injected into or already in the reservoir (i.e., the dynamic characteristics) based on the inputs and the static characteristics (e.g., porosity, permeability, etc.). The predicted output levels can define a range or distribution corresponding to ranges or distributions of the input parameters.

By injecting steam or otherwise introducing thermal changes in the reservoir, the composition and/or thermal properties of the reservoir change. These changes are modeled by the reservoir simulator. Among other things, the reservoir simulator performs a pressure, volume, and temperature (PVT) analysis based on the reservoir modeling parameters and the input parameters. The results of the PVT analysis are used to model subsequent changes in the reservoir. Typically, the PVT analysis and other modeling is performed using a Monte Carlo simulation using the ranges or distributions of input parameters and reservoir modeling parameters to obtain a range or distribution of outputs.

An economic analysis is performed using the input parameters and the output levels from the reservoir simulator (225). For example, an economic analysis module is used to predict economic consequences of the set of input parameters. The economic analysis module can use economic modeling parameters (e.g., ranges or distributions of costs, market values, market variables, and the like) along with a software model for predicting total costs, revenues, return on investment, profits, or other economic indicators or benchmarks. In general, the results of the economic analysis relate to financial or intangible measures, while the output levels predicted by the reservoir simulator relate to physical amounts produced or by-products of production, in the reservoir and/or extracted from the reservoir. In an initial iteration of the process 200, the economic analysis can be used to select preferred (e.g., optimum or relatively optimum) values from the ranges or distributions of input parameters. In subsequent iterations of the process 200 (i.e., after obtaining some historical information regarding how well predicted outputs matched actual outputs), the economic analysis can be used to identify the predicted economic outcome of previously identified input parameters.

Based on the economic analysis, a determination is made as to whether the input parameters should be adjusted (230). In some implementations, it is unnecessary to adjust the input parameters in an initial iteration of the process 200. For subsequent iterations, however, it may be desirable to adjust the input parameters if the economic analysis determines that the predicted economic outcome of the previously identified input parameters is undesirable. For example, if the predicted costs exceed some predetermined threshold or if the predicted return on investment is below some predetermined threshold, it may be necessary or desirable to adjust the set of input parameters. The criteria for determining whether the input parameters should be adjusted can be selected based on the desired outcome. For example, maximizing revenue may lead to undesirably high costs and maximizing return on investment may lead to unacceptably low total profit. Accordingly, multiple economic parameters can be used to determine whether the input parameters should be adjusted.

If it is determined that the set of input parameters should be adjusted, the set of input parameters are changed (235). The set of input parameters can be adjusted in increments according to a predetermined pattern or can be intelligently adjusted based on prior iterations (e.g., increasing fuel input beyond a certain level increases costs at a rate that exceeds increases in revenue) or on information that can be deduced from the economic analysis (e.g., revenue is too low for the current set of inputs and reducing steam production cannot increase revenue). In some implementations, the input parameters can be adjusted such that the predicted economic result is acceptable, meets one or more requirements or preferences, or is relatively optimized (i.e., in that it is better than other possible options, although not necessarily the best possible result).

In some implementations, predicted output levels and predicted economic results are calculated for multiple possible sets of input parameters and input parameters that produce a relatively optimal set of results is selected. For example, a multi-dimensional matrix, with each dimension corresponding to different values for a particular input (e.g., fuel, water, or air), can be used to store the predicted results of different combinations of inputs. Thus, predicted outputs and economic results are calculated for ranges of input values, and a specific combination of inputs is selected that is predicted to result in an improved or relatively optimal set of outputs and/or economic results.

Once a set of input parameters is selected for actual use in the thermal recovery operations, the set of input parameters and the corresponding set of predicted outputs are stored (240), although in cases where the input changes and predicted outputs remain unchanged from previously stored values it is unnecessary to store the information again. The current set of input parameters are applied (245) to a thermal generation process (i.e., to control the amount of heat and other properties and substances introduced into the reservoir). For example, the set of input parameters are used to adjust valves that control the air, water, and fuel inputs for a downhole or surface steam generator. In some cases, the set of input parameters that are stored (at 240) can include quantities or rates measured by sensors (e.g., at or near the valves). The stored data (settings values and measured values) can be used to accurately track the inputs (and changes therein) to the thermal generation process in real time.

The outputs of the thermal generation process are measured (250). The outputs can include, for example, steam and flue gas injected into the reservoir and water, oil, and flue gas recovered by a production well. For example, flue gas is injected into (and therefore may be recovered from) the reservoir in the case of downhole steam generation. The outputs can be measured in real time using sensors in injection, production, and/or observation wells. The output measurements are then stored (255) for use in accurately tracking the outputs (and changes therein) in real time.

The actual outputs are compared with the predicted outputs to determine if they differ (260). Typically, the comparison is performed for a particular set of input parameters. However, the input parameters can change over time, and a change in input parameters applied at a particular time can take a period of time to result in a corresponding change in outputs. Moreover, the effect on the outputs can also have a time-varying component. As a simple example, an input at time t=0 results in a detectable change in output beginning at time t=1, increasing until time t=2, and disappearing at time t=3. Thus, the comparison can include a relatively complex analysis of actual and predicted outputs over a period of time.

In addition, the comparison of actual outputs to predicted outputs can include a range of error. In other words, the actual and predicted outputs may not be considered different unless they differ by more than some threshold amount. In some cases, the error range can be included in the predicted output itself if the reservoir simulator generates a range of predicted output values. In addition or as an alternative, an error interval (e.g., defined by an absolute variance or based on a percentage variance from one or more predicted values) can be defined around the predicted output values.

The comparison can be performed, for example, at regular intervals, based on some other predetermined schedule, at times selected by a user or a computer control system, and/or in response to a change in a detected input or output that exceeds some threshold rate or amount. In some implementations, the comparison can be performed in real time. Because of the delay between a change in input parameters and a corresponding change in outputs, however, real-time comparisons do not generally imply use of the real-time input data as it is collected. Instead, input parameters and the corresponding predicted outputs can be stored and used for comparisons at an appropriate time when actual outputs are detected.

In addition, quasi-real-time comparisons can be delayed from a real-time collection of output data. For example, as actual output data is collected, it can be averaged or filtered over a period of time. Similarly, the input parameters and the corresponding predicted outputs can be averaged or filtered over a corresponding period of time. The averaged or filtered, predicted and actual data can be compared at regular intervals, according to some other schedule, or in response to detected changes in conditions. Quasi-real-time comparisons, therefore, can rely upon a real-time collection of data in which collected data (averaged, filtered, or otherwise) is available on-demand for use in an automated comparison and tuning analysis.

If it is determined that there is not a difference between the actual and predicted outputs (at 260), the process 200 returns to applying the current input parameters (at 245), detecting and storing outputs (at 250 and 255), and performing comparisons of actual and predicted (at 260). In general, these aspects of the process 200 are performed continuously, relatively continuously, or periodically rather than merely an iterative process, which might be more applicable in a static process. Accordingly, multiple changes in the input parameters can be applied and stored, and/or output levels can be continuously monitored, between successive comparisons of actual and predicted outputs. Alternatively, individual processing steps can be performed in parallel on an ongoing basis.

If it is determined that there is a difference between the actual and predicted outputs (at 260), the reservoir simulator can be tuned (265) to improve the performance of the reservoir simulator. Tuning of the reservoir simulator can involve adjusting the reservoir modeling parameters and can be performed, for example, in real time, on a periodic basis, or upon detecting a change in conditions. The reservoir modeling parameters can be tuned by making adjustments so that predicted outputs match actual outputs for a given set of input parameters. In particular, the actual outputs corresponding to a particular set of input parameters (from 240, 250, and 255) can be used to perform a hindsight prediction of outputs using modeling parameters that are iteratively tuned until the reservoir simulator produces a prediction that matches the actual output. In some implementations, sets of actual and predicted outputs (i.e., varying outputs detected or predicted over a period of time) and corresponding sets of input parameters (i.e., that are also varying over a corresponding period of time) are used in a more complex tuning procedure.

Each reservoir modeling parameter can be tuned by shifting, narrowing, expanding, or otherwise modifying a range or distribution curve that represents the modeling parameter. Reservoir modeling parameters can also be separately tuned for different regions within the reservoir. For example, actual output data from two different wells can be used to tune local reservoir modeling parameters in different ways. Accordingly, the feedback provided by the process 200 can be used to obtain a more accurate and realistic model of a reservoir by detecting location-specific differences between actual and predicted outputs and performing location-specific parameter tuning.

In some cases, it is possible to perform some tuning of reservoir modeling parameters even if there is not a difference between the actual and predicted outputs (at 260). For example, if there is not a difference, the range or distribution curve for one or more of the modeling parameters may unnecessarily account for too much uncertainty in the reservoir characteristics. Accordingly, it may be possible to tune the reservoir simulator by narrowing a range or distribution curve for one or more of the modeling parameters.

Once the reservoir simulator is tuned, a new prediction of output levels corresponding to the current set of input parameters is calculated (220) and the process 200 continues. For example, the new prediction can result in changes in the predicted economic results, which causes a different set of input parameters to be selected. Changes in the set of input parameters can also occur other than in response to changes in the reservoir modeling parameters. For example, changes in economic parameters or goals can lead to an update in input parameters independent of any change in modeling parameters. Accordingly, the reservoir simulator can be tuned, and new input parameters and predicted outputs can be determined, continuously, in real time, or periodically. In addition, this tuning and determining of new input parameters and predicted outputs can be performed in parallel with other processes.

Additional closed-loop controls can be applied to tune the input levels to the steam generator 120. For example, the economic model 115 may determine that a valve should be set at a level that allows a five cubic feet per minute flow rate. The steam generator 120 can include additional sensors to measure the actual flow rate. These additional sensors can be used to determine if the actual flow rate matches the desired flow rate and to tune the valve accordingly (i.e., until it produces a five cubic meter per minute flow rate).

The reservoir simulator 110 and the economic model 115 can be used to predict outputs and economic results and interactions between the two on one or more different horizons. For example, the reservoir simulator 110 and/or the economic model can predict both short-term and long-term effects of input parameter changes and strategies on the reservoir, recovery, and economic impact. This capability allows the system 100 to avoid applying input parameters that might have a short-term benefit but that cause long-term profits or revenues to plummet. Among other things, flue gas can have an impact on the reservoir because it tends to change the composition of oil in the reservoir as the flue gas and oil mix. In some cases, flue gas can have a beneficial impact on the reservoir, while in other cases it can have a detrimental impact. Physical and economic models can take into account the impact of flue gas during the modeling process.

Figure 3:
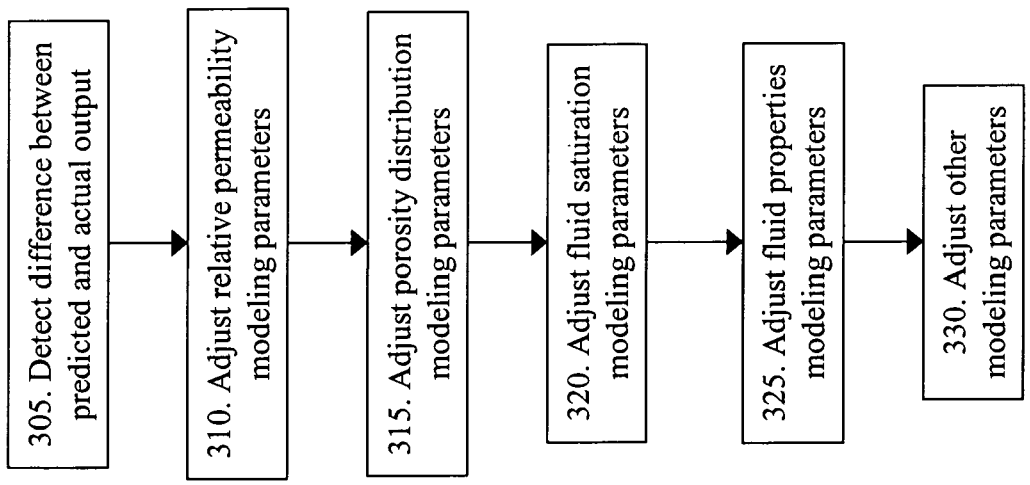
FIG. 3 is a flow diagram of an example of a process for tuning reservoir modeling parameters.

FIG. 3 is a flow diagram of an example of a process 300 for tuning reservoir modeling parameters. A difference between a predicted output and an actual output is detected (305). In response, one or more modeling parameters relating to relative permeability is adjusted (310) to improve matching between the predicted and actual output (e.g., to make the reservoir simulator produce a prediction that is closer to the actual output for a particular set of input parameters). Modeling parameters relating to a porosity distribution are tuned (315), and modeling parameters relating to fluid saturation are adjusted to improve matching (320). Modeling parameters relating to fluid properties are also adjusted (325), and other parameters (e.g., relating to constraints on the oil, reservoir, steam, and the like) are tuned (330).

Modeling parameters can be adjusted, at each step or for the overall process 300, to improve matching for water first and then for oil, or vice versa. In addition, tuning can be performed using multiple sets of historical parameters. For example, over time, more data is collected regarding input parameters and corresponding outputs. In some implementations, the tuning process may attempt to adjust the model to obtain the best matching for all of the historical samples, for only the most recent n samples, or for some other subset of samples. The effect of certain historical data or on certain modeling parameters can be gradually or quickly reduced over time. For example, some modeling parameters may relate to properties that can change over time, such as relative composition, which can change as oil is extracted and water, in the form of steam, is injected. The effect of at least older historical data on tuning of such modeling parameters can be reduced or eliminated.

The described techniques can be used for both cyclic steam stimulation and continuous steam flooding thermal operations, although the type of thermal operation can affect the sampling frequency of input and/or output measurements, the frequency of updates to the input parameters, the modeling frequency, and the like. For example, in cyclic steam stimulation, modeling parameters are generally tuned periodically, following at least a portion of the production phase, although data can be collected in real time. In continuous steam flooding, modeling and modeling parameter updates can be performed periodically or relatively continuously.

The functional operations described in this specification can be implemented in digital electronic circuitry, or in computer software, firmware, or hardware, including the structural means disclosed in this specification and structural equivalents thereof, or in combinations of them. The techniques can be implemented using one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the techniques can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the described techniques, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 4:
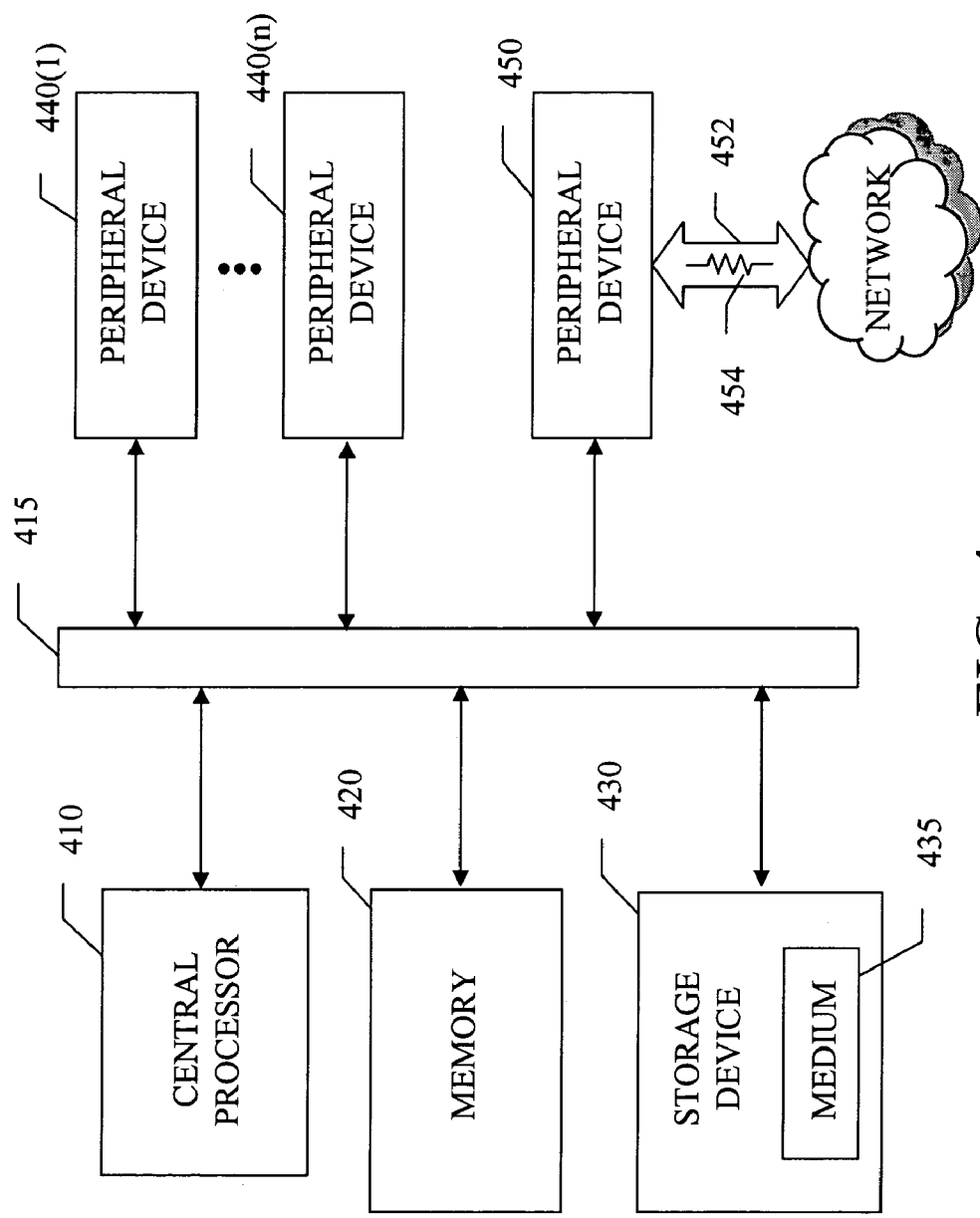
FIG. 4 is a block diagram illustrating an example data processing system in which one or more components of a system for controlling thermal recovery operations can be implemented.

FIG. 4 is a block diagram illustrating an example data processing system 400 in which one or more components of a system for controlling thermal recovery operations can be implemented. The data processing system 400 includes a central processor 410, which executes programs, performs data manipulations, and controls tasks in the system 400. The central processor 410 is coupled with a bus 415 that can include multiple busses, which may be parallel and/or serial busses.

The data processing system 400 includes a memory 420, which can be volatile and/or non-volatile memory, and is coupled with the communications bus 415. The system 400 can also include one or more cache memories. The data processing system 400 can include a storage device 430 for accessing a storage medium 435, which may be removable, read-only, or read/write media and may be magnetic-based, optical-based, semiconductor-based media, or a combination of these. The data processing system 400 can also include one or more peripheral devices 440(1)440(n) (collectively, devices 440), and one or more controllers and/or adapters for providing interface functions.

The system 400 can further include a communication interface 450, which allows software and data to be transferred, in the form of signals 454 over a channel 452, between the system 400 and external devices, networks, or information sources. The signals 454 can embody instructions for causing the system 400 to perform operations. The system 400 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 400 and/or delivered to the machine 400 over a communication interface. These instructions, when executed, enable the machine 400 to perform the features and functions described above. These instructions represent controllers of the machine 400 and can be implemented in a high-level procedural and/or object-oriented programming language, and/or in assembly/machine language. Such languages can be compiled and/or interpreted languages.

A number of implementations have been described. Nevertheless, it will be understood that various modifications may be made. For example, the described systems and techniques can be used for tuning modeling parameters of a thermal reservoir simulator used to control air input for in-situ combustion and/or for thermal operations for recovery of other types of petroleum or other substances. In addition, one or more of the operations described in FIGS. 2 and 3 can be performed in parallel or in a different order than that shown or described. Accordingly, other implementations are within the scope of the following claims.

What is claimed is:

1. A method for controlling thermal recovery, the method comprising:
generating, by a computer, input parameters for use in controlling a thermal recovery operation for a reservoir, the input parameters generated using a reservoir simulator and the input parameters having a corresponding predicted output of the thermal recovery operation;
continually receiving data indicative of actual output from the reservoir;
automatically comparing the received data indicative of actual output with the predicted output; and
automatically updating the reservoir simulator based on the comparison of the data indicative of the actual output with the predicted output.

2. The method of claim 1 wherein automatically updating the reservoir simulator based on the comparison comprises automatically updating the reservoir simulator in response to a detected change in at least one of the data indicative of the actual output, economic parameters, or reservoir conditions, the change exceeding a corresponding predetermined threshold.

3. The method of claim 1 wherein the reservoir simulator comprises a reservoir model defining a plurality of reservoir parameters.

4. The method of claim 1 wherein the thermal recovery operation comprises using a thermal generator operable to introduce steam into the reservoir.

5. The method of claim 1 wherein the input parameters comprise amounts of at least two substances selected from the group consisting of air, water, and fuel.

6. The method of claim 1 wherein the output of the thermal recovery operation comprises amounts of at least two substances selected from the group consisting of water, oil, and flue gas.

7. The method of claim 1 wherein comparing the received data indicative of actual output from the reservoir with the predicted output comprises comparing the received data indicative of actual output from the reservoir with the predicted output in real-time.

8. The method of claim 1 wherein generating input parameters includes performing an automated economic analysis involving the input parameters and the corresponding predicted output.

9. The method of claim 8 wherein the automated economic analysis comprises tuning the input parameters to improve a predicted economic output.

10. The method of claim 1 wherein the thermal recovery operation comprises using a downhole thermal generator.

11. The method of claim 1 wherein the thermal recovery operation comprises using a surface thermal generator.

12. The method of claim 1 wherein automatically updating the reservoir simulator comprises tuning the reservoir simulator based on at least two of historical input parameters, corresponding historical data indicative of actual output, or predicted output corresponding to the historical input parameters.

13. The method of claim 12 wherein tuning the reservoir simulator comprises adjusting at least one reservoir parameter to improve matching between an actual output from the reservoir and a predicted output from the reservoir.

14. A system comprising:
a thermal generator;
a reservoir simulator operable to model thermal operations in a subsurface reservoir, the thermal operations performed using the thermal generator;
a data collection subsystem operable to collect data indicative of output levels predicted using the reservoir simulator, the predicted output levels corresponding to selected input parameters for the thermal generator, and data indicative of actual output levels, the data indicative of actual output levels continually collected, wherein the reservoir simulator is automatically tuned based on an automatic comparison between the collected data indicative of predicted output levels and the collected data indicative of actual output levels.

15. The system of claim 14 wherein the input parameters for the thermal generator are selected, at least in part, by the reservoir simulator.

16. The system of claim 14 wherein the reservoir simulator is automatically tuned in response to at least one of a detected change in conditions or a detected difference between the predicted output levels and the actual output levels.

17. The system of claim 14 wherein the predicted output levels and the actual output levels comprise amounts of fluids recovered from the reservoir.

18. The system of claim 14 wherein the reservoir comprises a heavy oil reservoir.

19. The system of claim 14 wherein the thermal generator comprises a steam generator and the selected input parameters comprise control parameters for the steam generator.

20. The system of claim 19 wherein the steam generator comprises a surface steam generator.

21. The system of claim 19 wherein the steam generator comprises a downhole steam generator.

22. The system of claim 14 further comprising an economic model operable to model economic results corresponding to at least one set of input parameters, the selected input parameters determined, at least in part, using the economic model.

23. The system of claim 14 further comprising sensors operable to detect at least one of input levels for the thermal generator, output levels from the thermal generator, or output levels from the reservoir.

24. An article comprising a computer-executable program tangibly embodied on a computer-readable storage medium, the program comprising instructions for causing data processing apparatus to perform operations comprising:
calculating a predicted output level for a thermal recovery operation in a reservoir using a set of reservoir modeling parameters;
identifying a set of input parameters corresponding to the predicted output level;
performing continual monitoring of a difference between an actual output level for the reservoir and the predicted output level; and
automatically updating the set of reservoir modeling parameters based on the monitored difference.

25. The article of claim 24 wherein automatically updating the set of reservoir modeling parameters is further based on detected input levels for a downhole steam generator used in the thermal recovery operation.

26. The article of claim 24 wherein the instructions further cause data processing apparatus to perform operations comprising:
calculating an economic result associated with at least one set of input parameters; and
tuning the set of input parameters and the corresponding predicted output level based on the calculated economic result.

27. The article of claim 24 wherein automatically updating the set of reservoir modeling parameters based on the monitored difference is performed in response to identifying a difference in excess of a threshold level between the predicted output level and the actual output level.

28. The article of claim 24 wherein the predicted output level comprises at least one of a rate or a composition of fluids recovered from the reservoir.

29. A system comprising:
means for generating input parameters for use in controlling a thermal recovery operation for a reservoir, the input parameters generated using a means for simulating the reservoir and the input parameters having a corresponding predicted output of the thermal recovery operation;
means for substantially continuously receiving data indicative of actual output from the reservoir;
means for automatically comparing the received data indicative of actual output from the reservoir and the predicted output; and
means for automatically updating the means for simulating the reservoir based on the comparison of the data indicative of the actual output with the predicted output.

30. The system of claim 29 wherein the means for generating input parameters includes means for performing an automated economic analysis involving the input parameters and the corresponding predicted output.

31. The system of claim 29 wherein the means for automatically updating tunes the means for simulating the reservoir based on at least two of historical input parameters, corresponding historical data indicative of actual output, or predicted output corresponding to the historical input parameters, wherein at least one of the historical input parameters or the historical data indicative of actual output are collected in real time.

32. The method of claim 1, further comprising:
performing a first thermal recovery operation;
determining that the comparison does not exceed a predetermined threshold difference; and
performing a second thermal recovery operation based on the reservoir simulator without updating the reservoir simulator based on the comparison of the data indicative of the actual output with the predicted output.

* * * * *